United States Patent

Merkel et al.

[11] Patent Number: 5,819,361
[45] Date of Patent: Oct. 13, 1998

[54] WIPER BLADE FOR A WINDOW WASHING APPARATUS

[75] Inventors: Wilfried Merkel, Kappelrodeck; Jürgen Mayer, Gaggenau, both of Germany; Eric Pollaris, Hasselt, Belgium

[73] Assignee: Robert Bosch GmbH, Stuttgart, Germany

[21] Appl. No.: 714,127
[22] PCT Filed: Dec. 12, 1995
[86] PCT No.: PCT/DE95/01775
§ 371 Date: Sep. 16, 1996
§ 102(e) Date: Sep. 16, 1996
[87] PCT Pub. No.: WO96/22205
PCT Pub. Date: Jul. 25, 1996

[30] Foreign Application Priority Data

Jan. 17, 1995 [DE] Germany .................. 295 00 632 U

[51] Int. Cl.⁶ .................................................. B60S 1/38
[52] U.S. Cl. .................... 15/250.46; 403/153; 15/250.44
[58] Field of Search ........................ 15/250.46, 250.361, 15/250.48, 250.44, 250.31, 250.32, 250.43; 403/24, 153, 154, 161, 162; 411/514

[56] References Cited

U.S. PATENT DOCUMENTS

| | | | |
|---|---|---|---|
| 1,416,700 | 5/1922 | Fenicle | 411/514 |
| 4,793,020 | 12/1988 | Stratton et al. | 15/250.46 |
| 4,795,288 | 1/1989 | Sakai | 403/161 |
| 5,271,122 | 12/1993 | Roth et al. | 15/250.46 |

FOREIGN PATENT DOCUMENTS

| | | | |
|---|---|---|---|
| 4411084 | 10/1994 | Germany | 15/250.46 |
| 4411085 | 10/1994 | Germany | 15/250.46 |

*Primary Examiner*—Gary K. Graham
*Attorney, Agent, or Firm*—Michael J. Striker

[57] ABSTRACT

A wiper blade is proposed which is a part of windshield wiper systems of motor vehicles and is used for cleaning windshields of motor vehicles. The wiper blade has a multi-link elongated support bow system for a wiper strip resting against the windshield and has at least one upper support bow, on whose at least one end a lower support bow is hinged by means of a hinge bolt disposed transversely to the long extension of the support bow, wherein the upper bow of a U-shaped cross section in the area of the hinged connection extends with its U-shaped legs over a section of the lower bow of a U-shaped cross section in such a way, that the U-shaped legs of the two support bows essentially lie parallel with each other. The hinge bolt fittingly projects through the U-shaped legs in openings which are coaxial in respect to each other and the hinge bolt is provided with means for securing it against axial displacement in its center area located between the U-shaped legs of the lower bow. The securing means are connected in one piece with the hinge bolt made of an elastic material and can be deflected against a spring force at least as far as the surface area of the bolt, wherein the securing means have detent shoulders located between the U-shaped legs of the lower bow and facing away from each other, which cooperate with counter-shoulders of the lower bow facing them. It is assured in this way that the lower bow as well as the upper bow are always smoothly pivotable in respect to the hinge bolt.

12 Claims, 2 Drawing Sheets

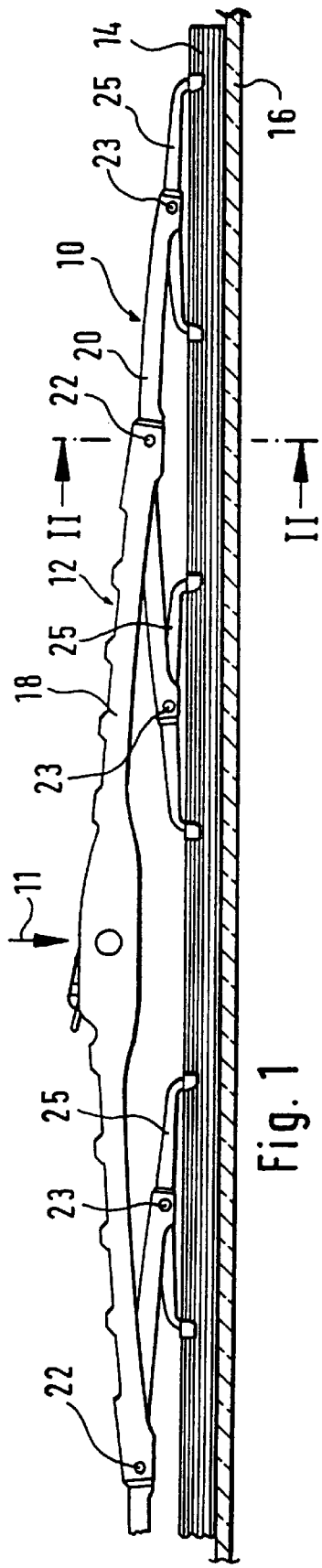
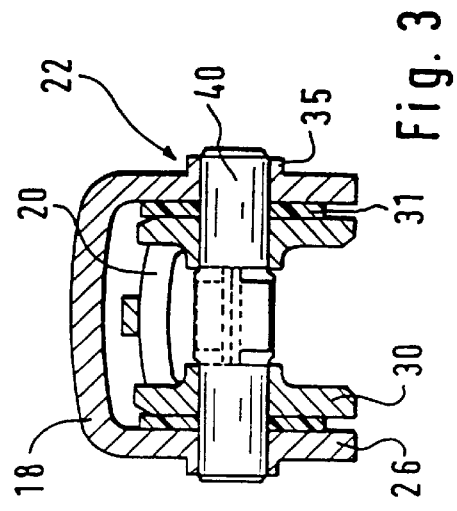
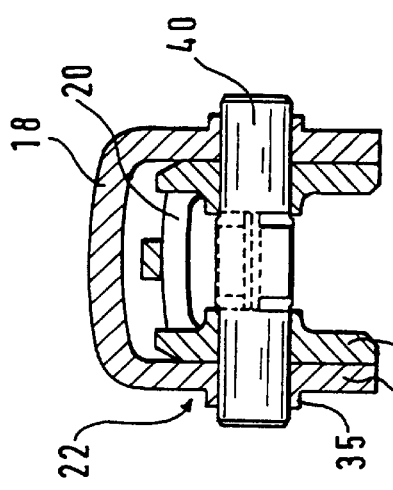

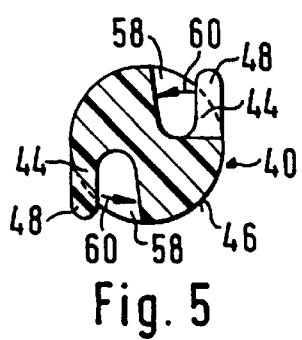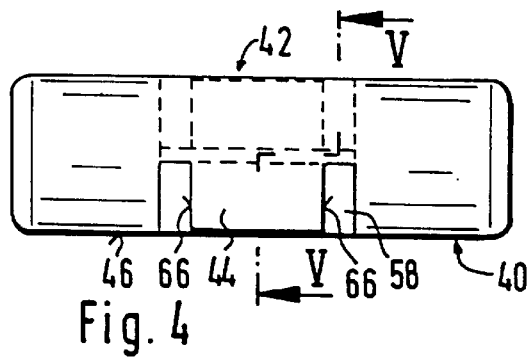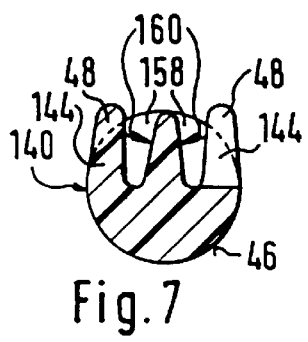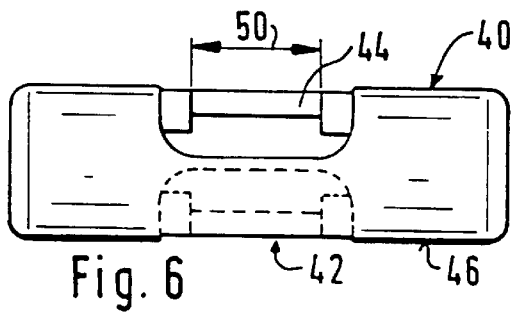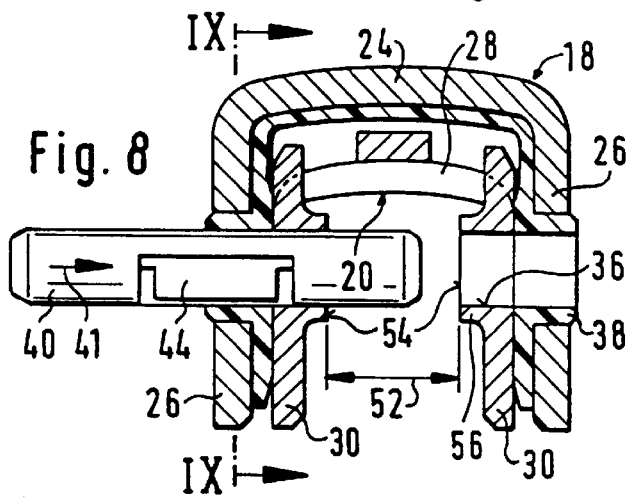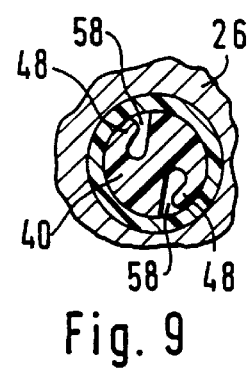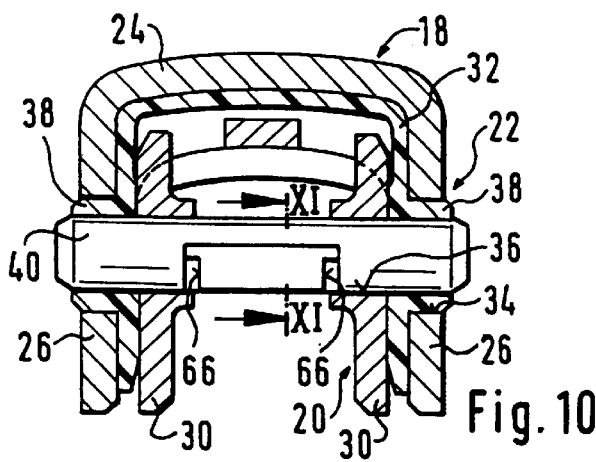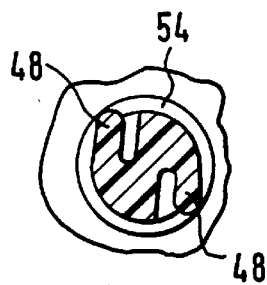

WIPER BLADE FOR A WINDOW WASHING APPARATUS

BACKGROUND OF THE INVENTION

The invention is based on a known wiper blade (U.S. Pat. No. 4,795,288), wherein the hinge bolt has an elastically compressible spindle-shaped thickening in its center section which allows insertion of the hinge bolt into its seated position. The two widened ends of the thickening are arranged and designed in such a way that they jam in the openings of the lower bow and cause the fixed seating between the bolt and the lower bow. If the allowed unavoidable tolerances of the openings are in unfavorable positions, it can occur that the ends of the thickenings project through the lower bow and also hold the upper bow in place, so that the mobility in the support bow joint is at least hampered.

SUMMARY OF THE INVENTION

Accordingly, it is an object of the present invention to provide a wiper blade for a window washing apparatus, which avoids the disadvantages of the prior art.

In keeping with these objects and with others which will become apparent hereinafter, one feature of the present invention resides, briefly stated in a wiper blade for windshield wiper systems of motor vehicles, which wiper blade has in accordance with the invention the securing means end on clearly defined stop shoulders located between the facing sides of the U-shaped legs of the lower bow. Because of this it is impossible for the securing means to act on the upper bow. Thus, the required relative movement between the upper and lower bows is assured.

A particularly advantageous embodiment of the securing means results if these are constituted by at least one tab-like wing having the stop shoulders, which is connected with one of its long sides with the hinge bolt inside the surface area and essentially extends tangentially in respect to the hinge bolt over the latter's surface area, if furthermore the wing has a length which is matched to the distance between the facing surfaces of the U-shaped legs of the lower bow and if furthermore a recess in the hinge bolt, which extends past the length of the wing, is associated with the wing, into which the free end of the wing can be completely inserted.

A particularly secure hinged connection between the upper and the lower bow is achieved if, in respect to its length, two tab-like wings are disposed on the hinge bolt, wherein one recess in the hinge bolt is associated with each wing.

The two tab-like wings are suitably disposed in two spaced apart planes which are parallel with each other.

Advantages in manufacturing the hinge bolt result if, from the direction of their origin on the hinge bolt, the wings extend toward the same side.

Further advantageous embodiments and improvements of the invention are recited in the dependent claims.

BRIEF DESCRIPTION OF THE DRAWINGS

FIG. 1, a partial lateral view of a wiper blade placed on a windshield of a motor vehicles, FIG. 2, a section through a hinged connection between support bows which are part of the support bow system of the wiper blade, wherein the hinge is embodied in accordance with a first embodiment, FIG. 3, a section analogous to FIG. 2 through a differently designed hinged connection, FIG. 4, an enlarged view of the hinge bolt which is part of the hinged connection, FIG. 5, a section along the line V—V through the hinge bolt in accordance with FIG. 4, FIG. 6, a top view of the hinge bolt in accordance with FIG. 4, FIG. 7, a section in accordance with FIG. 5 through a differently designed hinge bolt, FIG. 8, an enlarged view of a section along the line II—II in FIG. 1 through a further embodiment of the hinge, wherein the hinge bolt in accordance with FIG. 4 is in an intermediate assembly position, FIG. 9, a partial section through the arrangement in accordance with FIG. 8 along the line IX—IX, FIG. 10, the hinge in accordance with FIG. 8 with the assembly of the hinge bolt completed, and FIG. 11, a partial section through the arrangement in accordance with FIG. 10 along the line XI—XI in FIG. 10.

DESCRIPTION OF THE PREFERRED EMBODIMENTS

A wiper blade 10, with which a multi-link elongated support bow system 12 is associated, is partially shown in FIG. 1. The support bow system is used for holding a resilient wiper strip 14 which is placed on the outer surface of windshield 16 of a motor vehicle, not shown in detail. The support bow system 12 has a plurality of support bows which are hingedly connected with each other in the manner of balance beams, of which a main bow 18 and an intermediate bow 20 are particularly intended to be examined here. The further remarks particularly deal with the hinged connection 22 between the bows 18 and 20. The hinged connection 22 can of course be realized in connection with all the hinged connections 23 between the other support bows of the support bow system. As FIG. 1 furthermore shows, the main bow 18 lies above the intermediate bow 20, so that in what follows the main bow 18 is identified as the upper bow and the intermediate bow 20 as the lower bow. It can furthermore be seen that in respect to the claw bows 25 hinged on it, the intermediate bow 20 is to be considered the upper bow in the sense of the invention, wherein the claw bows connected with it via the hinged connections 23 constitute lower bows in the sense of the invention. The claw bows 25 are themselves used for holding the wiper strip 14 and for distributing a force, indicated by the arrow 11, for placing the wiper blade 10 against the windshield 16.

The particular design of the hinged connections 22 or 23 will be explained in more detail by means of FIGS. 4 to 10. The sections represented in FIGS. 2, 3 and 10 show that the upper bow 18 is embodied to be U-shaped in the area of the hinged connection 22. This also applies to the lower bow 20. In this case the upper bow 18 has a U-shaped base 24 from which the two U-shaped legs 26 extend. The lower bow 20 also has a U-shaped base 28, which is followed by the two U-shaped legs 30. It can also be seen that the upper bow 18 extends over the lower bow 20 sufficiently far so that the U-shaped legs 26 or 30 of the two support bows 18 or 20 essentially lie parallel with each other. Since the two support bows 18 and 20 are made of metal, a plastic liner 32 has been disposed to prevent a contact between the metal of the two support bows 18 and 20. Openings 34 are provided in the legs 26 of the upper bow 18, which are disposed coaxially in respect to openings 36 in the U-shaped legs 30 of the lower bow 20 (FIG. 10). The openings 34 in the legs 26 of the upper bow 18 have a slightly larger diameter than is the case with the openings 36 in the legs 30 of the lower bow 20. Seating eyes 38 of the plastic liner 32 extending into the openings 34 reduce the diameter of the openings 34 to the diameter of the openings 36. A hinge bolt 40, penetrating the seating eyes 38 and thus the openings 34 in the upper bow 18 as well as the openings 36 in the lower bow 20, provides a hinged connection between the upper bow 18 and the lower bow 20.

In the exemplary embodiment in accordance with FIGS. 2 and 3, a respectively outwardly oriented rail 35 is disposed on the openings 34 to increase the seating surface of the hinge bolt 40 in the openings 34 of the upper support bow 18.

A first embodiment of the hinge bolt 40 is represented in FIGS. 4 to 6. Its diameter is matched to the diameter of the opening 36 in the lower bow 20 and to the bore diameter of the seating eyes 38 in such a way that it is freely rotatable in them. In its center area 42 it has two tab-like wings 44 which essentially have a rectangular shape. The wings 44 are connected by one of their long sides with the hinge bolt 40. The connecting point between the hinge bolt 40 and the wings 44 is located inside the surface area of the hinge bolt 40. The wings 44 essentially extend tangentially with the surface area 46 and with their free ends 48 they project past the surface area 46 of the bolt 40 (FIG. 5). The length 50 of the wings 44, measured in the axial direction of the hinge bolt 40, is matched to the distance 52 (FIG. 8) between the facing surfaces 54 of the U-shaped legs 30 of the lower bow 20 in such a way that it is slightly less than the distance 52. In the exemplary embodiment the inner, facing surfaces 54 of the lower bow 20 are constituted by the front faces of annular collars 56, which were formed when cutting the openings 36. FIGS. 4 to 6 furthermore show that a recess 58, disposed in the hinge bolt 40, is associated with each one of the two wings 44 and extends past the length 50 of the wings 44. The shape of the recesses 58 is such that the wings 44 of the hinge bolt 40, which is made of a resilient plastic material, can be deflected in the direction of the arrows 60 (FIG. 5) sufficiently far so that they can enter completely, i.e. also with the free ends 48, into the recesses 58. As further shown in FIG. 5, the two wings 44 are disposed in two planes extending at a distance from and essentially parallel with each other. The wings 44 extend in opposite directions from each other.

Another arrangement of the tab-like wings is represented in FIG. 7. A section through a hinge bolt 140 is illustrated there, wherein the wings 144, which are at a distance from each other and disposed in planes parallel with each other, extend from their point of origin on the hinge bolt 140 in the same direction. This arrangement can have advantages in production techniques. The basic design of the wings 144 and the association of the recesses 158 has also been made such that the problem-free insertion of the wings 144 into the recesses 158 in the direction of the arrows 160 is possible (FIG. 7).

The assembly of the hinged connection will be described in detail by means of FIGS. 8 to 11. First, the openings 34 or 36 in the U-shaped legs 26 or 30 are matched to each other in such a way that the hinge bolt 40 can be inserted into the openings 34 or 36 in the direction of the arrow 41 (FIG. 8). In the process it is of course necessary to insert the two wings 44 against a resilient force into the recesses 58 in the direction of the arrows 60 (FIG. 5) by means of certain aids, such as is illustrated in FIG. 9. When the hinge bolt 40 has reached its operational position shown in FIG. 10, the wings 44, which are now no longer held, spring back into their initial positions opposite the arrows 60 in FIG. 5, in which their free ends 48 again project past the surface area 46 of the hinge bolt 40 (FIG. 11). In this position the end surfaces 66 (FIG. 4), which are facing away and are spaced apart from each other, viewed in the direction of the longitudinal axis of the hinge bolt 46, form detent shoulders or securing means against axial displacement of the bolt 40, which cooperate in the sense of a limitation of the axial play of the hinge bolt 40 with the front faces 54 of the U-shaped legs 30 of the lower bow 20 acting as counter-detent shoulders.

In the embodiments of the hinged connection represented in FIGS. 2 or 3, the plastic liner 32 of the just described exemplary embodiment is constituted by a coating application, not shown in FIG. 2, which is disposed on at least one of the facing surfaces of the U-shaped legs 26 or 30 of the upper bow 18 or the lower bow 20.

In the exemplary embodiment in accordance with FIG. 3, a separate, plate-shaped component 31 made of plastic and in the form of a disk and having a through-bore for the hinge bolt 40, is disposed between the two facing surfaces of the U-shaped legs 26 or 30 instead of the plastic liner 32. Thus, in both embodiments in accordance with FIGS. 2 and 3, an intermediate layer (coating application or plastic disk 31) made of a material capable of easy sliding is disposed in the area of the hinge bolt between the facing surfaces of the U-shaped legs 26 or 30.

We claim:

1. A wiper blade for windshield wiper systems of motor vehicles, the wiper blade comprising a wiper strip; and a multi-link elongated support bow system for supporting said wiper strip, said bow system having at least one upper support bow, at least one lower support bow and a hinge bolt hingedly connecting said support bows with one another, said support bows having transverse U-shaped cross-sections provided in an area of said hinge, said U-shaped cross-section of said upper bow extending over a part of said U-shaped cross-section of said lower bow so that legs of said support bows extend essentially parallel to one another and have coaxial openings through which said hinge bolt extends, said hinge bolt further having means for securing said hinge bolt against an axial displacement in said opening with respect to said bow system, said securing means being connected with said hinge bolt and composed of an elastic material to be deflected against a spring force at least as far as a surface area of said bolt, said securing means being provided with detent shoulders located between said legs of said lower bow and facing away from one another, and counter shoulders provided on said lower bow so that said detent shoulders cooperate with said counter shoulders.

2. The wiper blade as defined in claim 1, wherein said said securing means include at least one wing which has one long side connected with said hinge bolt inside a surface area of said hinge bolt, said wing extending tangentially with said hinge bolt past the surface area and having a length which corresponds to a distance between facing surfaces of said legs of said lower bow, said hinge bolt having a recess extending past a length of said wing, said wing having a free end insertable in said recess.

3. The wiper blade as defined in claim 1, and further comprising an intermediate layer of a slidable material located in an area of said hinge bolt between facing surfaces of said legs of said upper bow and said lower bow.

4. The wiper blade as defined in claim 3, wherein said intermediate layer is formed as a coating provided on at least one of surfaces of said legs.

5. The wiper blade as defined in claim 3, wherein said intermediate layer is formed as a plate-shaped separate component which is composed of a plastic material and is provided with a through bore for said hinge bolt.

6. The wiper blade as defined in claim 3, wherein said intermediate layer is formed as a liner composed of a plastic material, said liner having seating eyes projecting into said openings of said outer bow.

7. The wiper blade as defined in claim 1, and further comprising outwardly directed rails provided on said upper bow and increasing a seating surface in said openings of said upper bow for said hinge bolt.

8. A wiper blade for windshield systems of motor vehicles, the wiper blade comprising a wiper strip; and a multi-link elongated support bow system for supporting said wiper strip, said bow system having at least one upper support bow, at least one lower support bow and a hinge bolt hingedly connecting said support bows with one another, said support bows having transverse-U-shaped cross-sections provided in an area of said hinge, said U-shaped cross-section of said upper bow extending over a part of said U-shaped cross-section of said lower bow so that legs of said support bows extend essentially parallel to one another and have coaxial openings through which said hinge bolts extends, said hinge bolt further having means for securing said hinge bolt against an axial displacement, said securing means being connected with said hinge bolt and composed of an elastic material to be deflected against a spring force at least as far as a surface area of said bolt, said securing means being provided with detent shoulders located between said legs of said lower bow and facing away from one another, and counter shoulders provided on said lower bow so that said detent shoulders cooperate with said counter shoulders, said securing means including at least one tab-shaped wing which is provided with said detent shoulders, said wing having one long side connected with said hinge bolt inside a surface area of said hinge bolt, said wing extending tangentially with said bolt past the surface area and having a length which corresponds to a distance between facing surfaces of said legs of said lower bow, said hinge bolt having a recess extending past a length of said wing, said wing having a free end insertable in said recess.

9. The wiper blade as defined in claim 8, wherein said securing means include two tab-shaped wings located on said hinge bolt, said hinge bolt having recesses associated with said wings.

10. The wiper blade as defined in claim 9, wherein said tab-shaped wings are located in planes which are spaced from one another and are parallel with each other.

11. The wiper blade as defined in claim 10, wherein said tab-shaped wings have points of origin on said hinge bolt and extend from said points of said origin in a same direction.

12. A wiper blade for windshield wiper systems of motor vehicles, the wiper blade comprising a wiper strip arranged to rest against a windshield; and a multi-link elongated support bow system provided for said wiper strip, said bow system having at least one upper elongated support bow, at least one elongated lower support bow and a hinge bolt hingedly connecting said support bows with one another, said hinge bolt defining a pivot axis, said support bows having U-shaped transverse cross-sections provided in an area of said hinge bolt and said U-shaped cross-section of said upper bow extends over a part of said U-shaped cross-section of said lower bow so that legs of said support bows extend essentially parallel to one another and have coaxial openings through which said hinge bolt extends, said hinge bolt having means for securing said hinge bolt against an axial displacement in said opening with respect to said bow system, said securing means being connected with said hinge bolt and composed of an elastic material to be deflected against a spring force at least as far as a surface area of said bolt, said securing means being provided with detent shoulders located between said legs of said lower bow, said shoulders defining end surfaces extending substantially perpendicular to said axis and facing away from one another, and counter shoulders provided on said lower bow so that said detent shoulders cooperate with said counter shoulders, said securing means including at least one tab-shaped wing attached along a longitudinal edge thereof to said bolt, said wing being provided with said detent shoulders.

* * * * *